A. R. SCHLOSSER.
VEHICLE ATTACHMENT.
APPLICATION FILED DEC. 3, 1920.

1,389,073.

Patented Aug. 30, 1921.

INVENTOR
A.R. SCHLOSSER
BY
Milton D. Crandall
ATTORNEY

UNITED STATES PATENT OFFICE.

ARTHUR R. SCHLOSSER, OF PLANKINTON, SOUTH DAKOTA.

VEHICLE ATTACHMENT.

1,389,073.  Specification of Letters Patent.  Patented Aug. 30, 1921.

Application filed December 3, 1920. Serial No. 427,935.

*To all whom it may concern:*

Be it known that I, ARTHUR R. SCHLOSSER, a citizen of the United States, and a resident of Plankinton, in the county of Aurora and State of South Dakota, have invented certain new and useful Improvements in Vehicle Attachments, of which the following is a specification.

My invention has for its primary object the production of a child's bed, embodying certain novel features of construction and arrangements of parts, particularly adapting it for use in automobiles.

Furthermore, the invention contemplates an improved motor vehicle bed, light in weight and simple and inexpensive in construction, yet durable and thoroughly efficient.

Another object of the invention is the production of a child's automobile bed, particularly adapted to be supported by the side closures of a vehicle tonneau.

Still another object of the invention is the production of a child's bed adapted to be adjusted to a suitable length to rest upon the opposite side closures of a vehicle tonneau, and when not in use to occupy a minimum space.

These and other objects and advantages I successfully attain in the embodiment hereinafter described, defined in the appended claims and illustrated in the accompanying drawings, which form a part of this application and in which like characters of reference indicate corresponding parts throughout the several views, of which:

Figure 1:
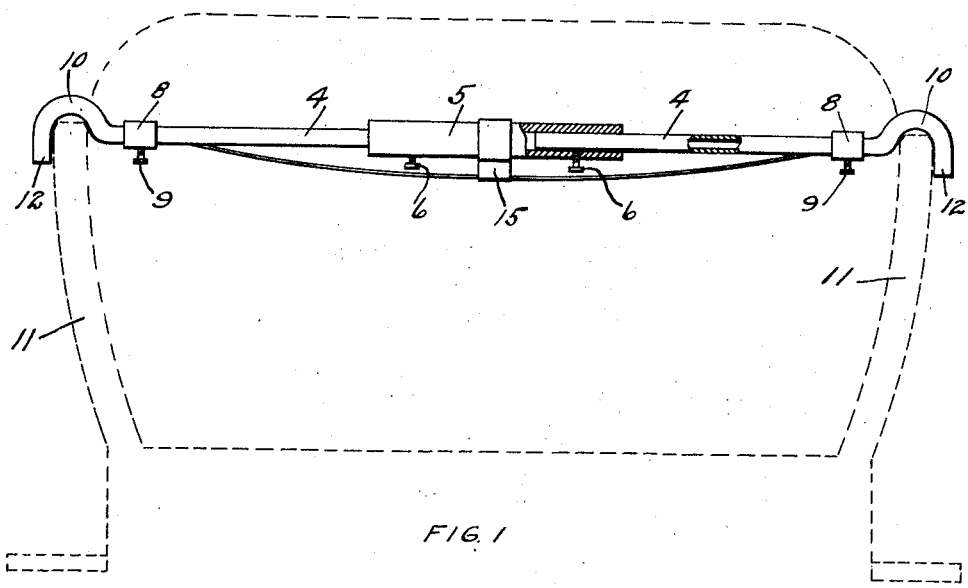
Figure 1 is a front elevation of a preferred form of my device as applied to a tonneau, parts being cut away.
Figure 2:
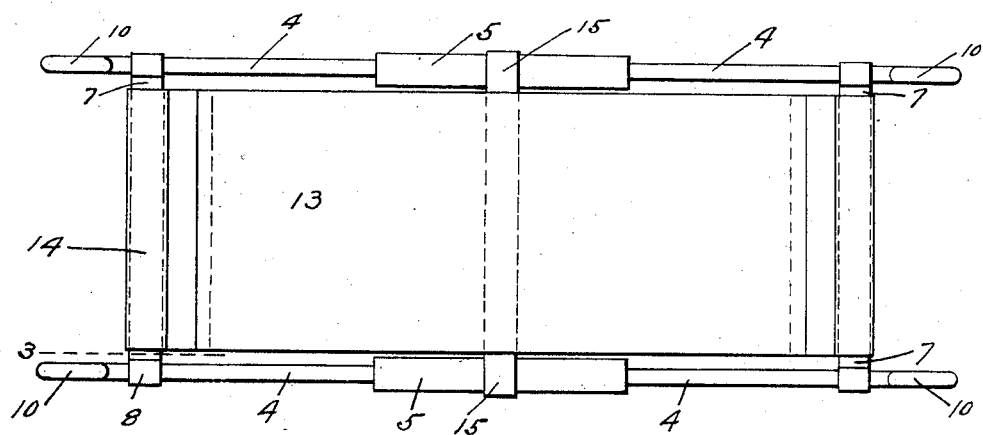
Fig. 2 is a plan thereof.
Figure 3:
Fig. 3 is a transverse section of one of the cross-members taken on the line 3—3, in Fig. 2, with an end portion of the body supporting sheet.

While I have illustrated and hereinafter described a preferred embodiment of the invention, I would not be understood as being limited to such specific construction, for various alterations and modifications may be made in the details of construction and arrangement of parts herein disclosed without departing from the spirit and scope of the invention as defined in the appended claims.

Referring, now, to the illustrations, my device consists, preferably, of two substantial parallel bars, each including two alined tubular rods, 4, having their adjacent end portions slidably inclosed by a sleeve, 5, and adjustably secured therein by set screws, 6, threaded into the sleeve. The corresponding remote end portions of the rods are inter-connected by flat cross-members, 7, having their ends formed with collars, 8, slidable upon and removable from the rods, 4, and adjustably secured thereon as by set screws, 9, threaded into the collars, 8. The free end portions of the rods, 4, are provided with hooks, 10, adapted to rest upon the opposite side closures of the tonneau of a vehicle, as the rear doors or side walls of the body, 11. The hooks, 10, are preferably formed with depending parts, 12, to engage the outer sides of the vehicle parts, 11, to prevent displacement of the bed.

The body-supporting element preferably consists of a fabric sheet, 13, having its end portions formed with transverse loops, 14, to inclose the cross-members, 7. The body supporting element, 13, may be prevented from sagging by means of a strap, 15, which extends below the element, 13, and is secured at its ends to the sleeves, 5.

The body supporting element, 13, may be stretched or slackened by adjusting the cross-members, 8, in the appropriate direction upon the rods, 4.

It will now be evident the device is simple and inexpensive in construction, durable, readily adjustable, occupies a minimum amount of space when not in use, and is so positioned, when in use, as not to inconvenience or discomfort the passengers.

Having thus described my invention, what I claim as new and desire to secure by Letters Patent of the United States is:

1. A bed for a vehicle having side closures, including two substantially parallel bars, each consisting of two end sections and an intermediate section, at least one of the end sections being in telescopic relation to the intermediate section and adjustably secured thereto, the remote end portions of the end sections being adapted to rest upon the closures and having depending parts to prevent displacement of the bars, cross members interconnecting the corresponding end sections of the bars, and a body-supporting element carried by the cross-members.

2. A bed for a vehicle having side closures, including two substantially parallel bars, each consisting of two end sections and an intermediate section, at least one of the end sections being in telescopic relation to the intermediate section and adjustably secured thereto, the remote end portions of the end sections being adapted to rest upon the closures and having depending parts to prevent displacement of the bars, cross members interconnecting the corresponding end sections of the bars, the cross members being provided with collars slidable on the end sections, set-screws threaded into the collars to engage the end sections, and a body-supporting element carried by the cross-members.

3. A bed for a vehicle having side closures, including two substantially parallel bars, each consisting of two alined rods, and a sleeve in which the adjacent end portions of the rods are adjustably secured, the remote end portions of the rods being adapted to rest on the closures and having depending parts to prevent displacement of the rods, cross-members interconnecting the corresponding rods of the bars, and a body supporting element carried by the cross-members.

4. A bed for a vehicle having side closures, including two substantially parallel bars, each consisting of two alined tubular rods, and a sleeve in which the adjacent end portions of the rods are adjustably secured, the remote ends of the rods being formed in hooks to engage the closures, cross-members interconnecting corresponding rods of the bars, and a body-supporting element carried by the cross-members.

In testimony whereof, I have hereunto set my hand this 8th day of November, 1920.

ARTHUR R. SCHLOSSER.